J. NICHOL.
FORK AND SCRAPER.
APPLICATION FILED JULY 21, 1909.

952,345.

Patented Mar. 15, 1910.

WITNESSES:

INVENTOR
JAMES NICHOL
BY Geo. H. Strong
HIS ATTORNEY

UNITED STATES PATENT OFFICE.

JAMES NICHOL, OF YERINGTON, NEVADA.

FORK AND SCRAPER.

952,345.  Specification of Letters Patent.  Patented Mar. 15, 1910.

Application filed July 21, 1909. Serial No. 508,720.

*To all whom it may concern:*

Be it known that I, JAMES NICHOL, a citizen of the United States, residing at Yerington, in the county of Lyon and State of Nevada, have invented new and useful Improvements in Forks and Scrapers, of which the following is a specification.

This invention relates to a fork and scraper.

The object of this invention is to provide a fork for gathering or scraping straw, manure and the like from the ground, and conveying and dumping it where desired.

A further object is to provide a fork that is simple in construction and efficient in operation.

The invention consists of the parts and the construction and combination of parts hereinafter more fully described and claimed, reference being had to the accompanying drawings, in which—

Figure 1:
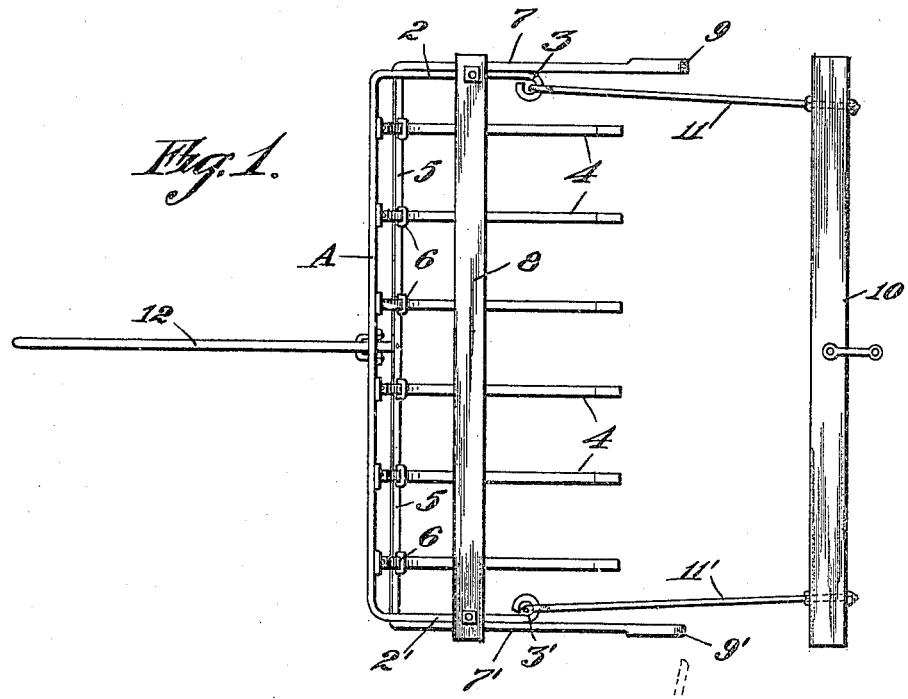
Figure 2:
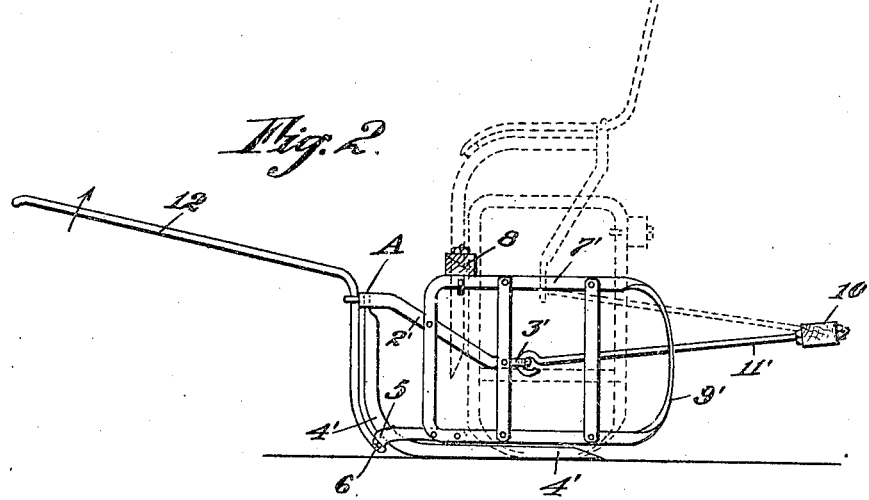

Figure 1 is a plan view of the invention. Fig. 2 is an end view.

In agricultural operations, the ordinary method of handling straw or manure, by means of a pitch fork, is both time-consuming and laborious. In many cases the material is gathered from the ground on pitchforks and loaded on wagons to be transported a short distance where it is unloaded and scattered by the same means. In order to facilitate the gathering, conveying and scattering of straw, manure and the like, the following described apparatus is devised.

In the drawings, A is a frame, preferably constructed of wrought iron, extending across the rear upper portion of the device, and bent at right angles at 2—2′ so as to form two forward projecting members which terminate in loops 3—3′.

A number of prongs or tines 4 have their upper ends securely fastened to the frame A from whence they extend downward and forward, the lower ends terminating in beveled points. A cross bar or brace 5 is secured to the prongs 4 by means of U-bolts 6, at a point proximate to the forward extending portion of the prongs. The outer ends of the brace bar 5 are secured to end frames 7—7′ to which the back frame A is also secured. A tie beam 8 connects the end frame 7—7′. The forward ends of the end frames 7—7′ are curved so as to form sled runners 9—9′, the function of which will become apparent hereinafter. A draft bar 10 is connected to the loops 3—3′ on the frame A by means of rods 11—11′. An operating handle 12 is secured to the frame A and brace bar. 5, and extends rearward of the device.

In operation, draft animals are suitably hitched to the draft bar 10, to pull the device forward. The operator walks behind and regulates the plane of travel of the prongs 4 by means of the handle 12. The curved form of the prongs at 4′ act as a rocker or fulcrum on which the prongs 4 may be tilted upward by a downward pressure on the handle 12. A pile of straw or manure being encountered the prongs 4 will enter the stack and take on a load to be transported where desired, the prongs 4 acting as runners on which the apparatus slides.

When it is desired to dump and distribute the contents of the fork, the operator lifts up the lever 12, thereby throwing the draft off center and causing the runners 9—9′ on the end frames to contact the ground so that a continued pull will elevate the fork into a vertical position as shown by the dotted lines in Fig. 2. In this position, the load is dumped and the apparatus rides upon the runners 9—9′ while the points of the prongs 4 are elevated above the ground so as to allow the material to pass thereunder. If it is desired to leave the pile intact, the lever 12 is allowed to go clear over so that the prongs will clear the pile; in this event the tie beam 8 will rest upon the rods 11—11′. By regulating the distance of the prongs above the ground, the load may be caused to be raked out and distributed over the surface of the ground. By this arrangement of prongs, the labor of handling straw and manure is greatly facilitated, and while the device operates more or less upon the same principle as the ordinary road shovel and scraper, it is peculiarly adapted to do the work required.

Having thus described my invention what I claim and desire to secure by Letters Patent is—

1. An apparatus for moving and distributing material, said apparatus including a main frame extending across the upper rear portion of the apparatus, draft appliances connected with the forward end of the main frame, spaced teeth or tines forming the bottom of the apparatus having upturned rear ends secured to said frame and having lower portions projecting forward from the frame, a supplemental frame forming the sides of the apparatus and having an arched front, and a handle by the tilting of which the apparatus may be turned and the teeth elevated above the ground and in position to simultaneously discharge and distribute the material.

2. In an apparatus for gathering and distributing material, a main frame extending across the rear upper portion of the apparatus, a draft connection swiveled to the front end of the frame, spaced parallel tines or teeth having vertical rear ends whose upper portions are secured to the frame and having curved intermediate portions, a handle by which the main frame may be tilted to regulate the position of the teeth in passing over the ground, and a supplemental frame formed of parallel, horizontal and vertical bars, said supplemental frame forming the sides of the apparatus and upon which the apparatus may be raised and the teeth turned to discharge the load.

3. In an apparatus for gathering and distributing material, a main frame consisting of a bar having the sides projecting forwardly at right angles with the rear portion, flexible draft connections with the front ends of said sides, angular forked teeth having vertical rear ends whose upper portions are fixed to the frame, said teeth having points projecting forwardly and having the backs curved, a handle by which the frame and teeth may be tilted to regulate the position of the teeth with relation to the ground, and to cause the fork to ride upon its curved back, a supplemental frame fixed to the main frame having a normal horizontal length greater than the distance of the draft connection from the surface of the ground and having an arched front, said frame being tiltable to ride upon the arched front and raise the forked teeth above the ground, and in a vertical position so as to discharge the load, and to afterward act as the distributer to spread it over the ground.

In testimony whereof I have hereunto set my hand in the presence of two subscribing witnesses.

JAMES NICHOL.

Witnesses:
VICTOR C. BERNARD,
ANGUS McLEOD.